United States Patent
Wier

[19]

[11] Patent Number: 6,039,352

[45] Date of Patent: Mar. 21, 2000

[54] BUCKLE TENSIONER

[75] Inventor: Franz Wier, Göggingen, Germany

[73] Assignee: TRW Occupant Restraint Systems GmbH, Alfdorf, Germany

[21] Appl. No.: 08/971,449

[22] Filed: Nov. 17, 1997

[30] Foreign Application Priority Data

Nov. 21, 1996 [DE] Germany ......................... 296 20 297 U

[51] Int. Cl.[7] ................................................. B60R 22/46
[52] U.S. Cl. ........................................... 280/806; 297/472
[58] Field of Search ............................. 280/806; 297/472

[56] References Cited

U.S. PATENT DOCUMENTS

| | | | |
|---|---|---|---|
| 3,292,744 | 12/1966 | Reglogle ................................. | 280/806 |
| 4,767,161 | 8/1988 | Sedimayr et al. ....................... | 297/472 |
| 4,917,210 | 4/1990 | Danicek et al. ........................ | 280/806 |
| 5,492,368 | 2/1996 | Pywell et al. ........................... | 280/806 |
| 5,676,397 | 10/1997 | Bauer ..................................... | 280/806 |

FOREIGN PATENT DOCUMENTS

| | | |
|---|---|---|
| 0186880 | 7/1986 | European Pat. Off. . |
| 0625450 | 11/1994 | European Pat. Off. . |
| 9404272 | 5/1994 | Germany . |

*Primary Examiner*—Kenneth R. Rice
*Attorney, Agent, or Firm*—Tarolli, Sundheim, Covell, Tummino & Szabo L.L.P.

[57] ABSTRACT

A buckle tensioner for a vehicle comprises a belt buckle and a linear drive connected to the belt buckle via a traction member. The traction member has a first end connected to the belt buckle and a second end connected to the linear drive. The buckle tensioner further comprises a deflection member adapted to deflect the traction member between the first and the second ends of the traction member. The deflection member comprises a holding section for the linear drive and an attachment section. The attachment section is adapted for fixing the deflection member in a vehicle-fixed manner.

23 Claims, 9 Drawing Sheets

BUCKLE TENSIONER

The invention relates to a buckle tensioner for a vehicle.

BACKGROUND OF THE INVENTION

Conventional buckle tensioners for a vehicle comprise a linear drive, which is connected with a belt buckle via a traction member, and a deflection member adapted to deflect the direction of the traction member between its end connected with the belt buckle and its end connected with the linear drive.

Such a buckle tensioner serves to take up the so-called slack in a safety belt system shortly before an accident impact so that the safety belt is applied as tightly as is expedient to a vehicle occupant wearing a seat belt and such occupant may participate in the deceleration of the vehicle from an early point in time. To take up such belt slack in a buckle tensioner arrangement the belt buckle is moved away from the vehicle-fixed anchoring points of the safety belt, for example toward the vehicle's floor. The displacement of the belt buckle may be produced using a linear drive which generally comprises a cylinder tube and a piston able to move in translation therein. The cylinder tube is provided with a propellant charge which, after ignition as caused by a suitable triggering system, produces gas under pressure, which in turn displaces the piston in the interior of the cylinder tube. Such displacement is transmitted by the traction member to the belt buckle.

BRIEF DESCRIPTION OF THE INVENTION

The invention provides a buckle tensioner which may be mounted on the vehicle in a particularly simple manner. Furthermore, the buckle tensioner of the invention is distinguished by particularly low costs of manufacture and of fitting. According to the invention, a buckle tensioner for a vehicle comprises a belt buckle and a linear drive connected to the belt buckle via a traction member. The traction member has a first end connected to the belt buckle and a second end connected to the linear drive. The buckle tensioner further comprises a deflection member adapted to deflect the traction member between the first and the second ends of the traction member. The deflection member comprises a holding section for the linear drive and an attachment section. The attachment section is adapted for fixing the deflection member in a vehicle-fixed manner. In the case of a buckle tensioner of the invention, the deflection member consequently has three functions: it deflects the traction member between the end thereof connected with the belt buckle and its end connected with the linear drive. This is more especially advantageous since for reasons of economy of space the linear drive of the buckle tensioner is generally to be mounted horizontally, that is to say for example parallel to the vehicle's floor, whereas the belt buckle is to be presented to the user in a position which is convenient for manipulation, i. e. generally arranged erected upright. Accordingly, the traction member must be deflected through approximately 90°. In addition to deflecting the traction member, the deflection member also serves as a holding section for the linear drive. The latter does not have to be separately attached to the vehicle. Finally, the deflection member also directly serves for attachment of the buckle tensioner to the vehicle. Accordingly, there is overall a line of action of the forces which is advantageous for an optimum conversion of the drive power of the linear drive into a tensioning movement of the belt buckle. All reaction forces occurring during tensioning and which more particularly act between the deflection of the traction member and the linear drive, are taken up by one and the same component. Moreover, the resulting overall force, which must be transferred to the vehicle, is again transmitted by the same component. In addition the buckle tensioner of the invention may be supplied as a preassembled complete unit, which is ready to be mounted in the vehicle.

In accordance with a preferred embodiment of the invention, there is a provision such that the deflection member is a bent sheet metal component. In this case, the deflection member may be manufactured integrally at minimum manufacturing expense and with a high degree of strength.

BRIEF DESCRIPTION OF THE DRAWINGS

The invention will now be described with reference to preferred embodiments, which are illustrated in the accompanying drawings.

DETAILED DESCRIPTION OF THE INVENTION

Figure 1:
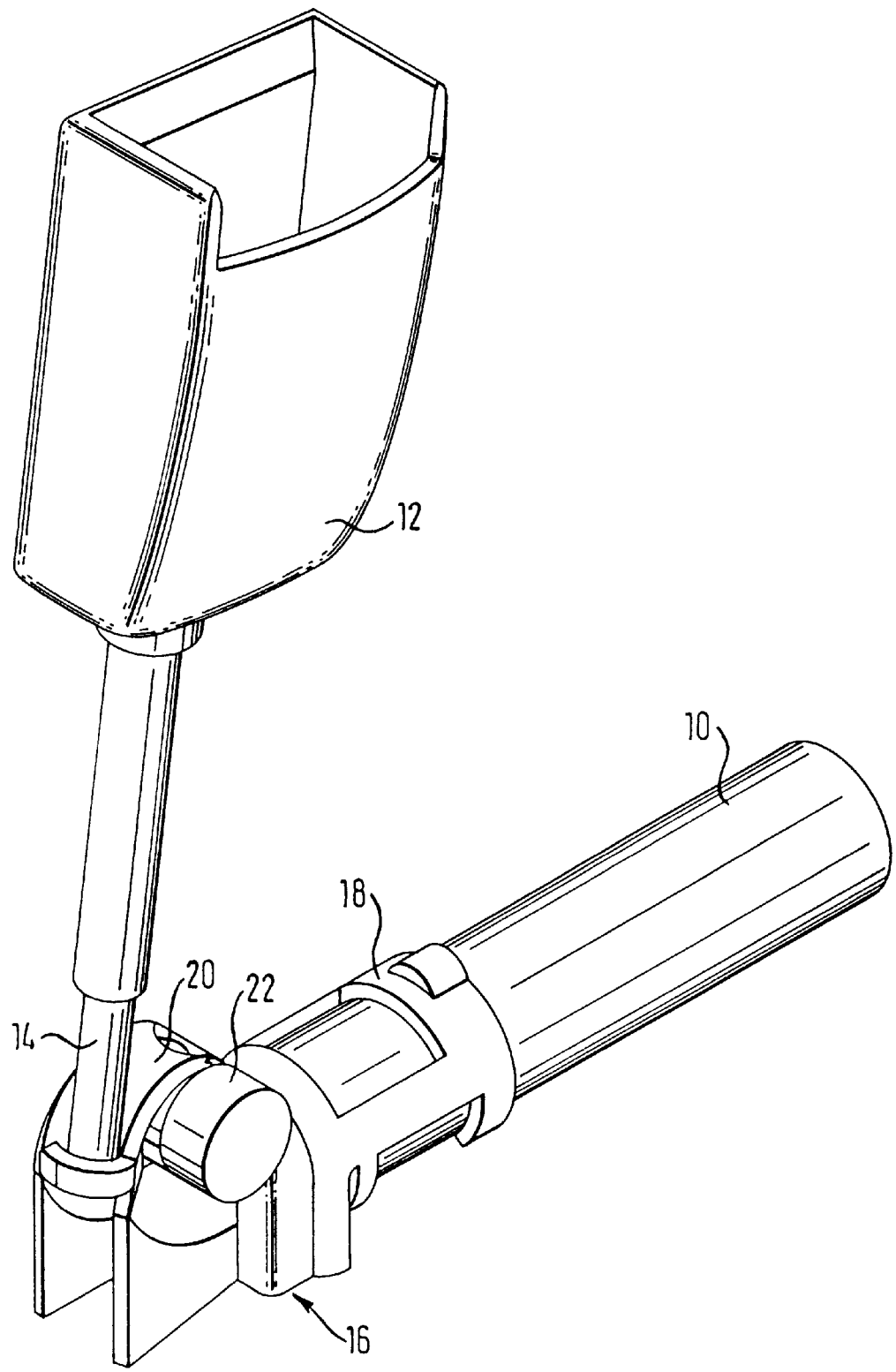
FIG. 1 is a diagrammatic perspective view of a buckle tensioner in accordance with a first embodiment of the invention.

In FIG. 1, the reader will see a diagrammatic perspective view of a first embodiment of a buckle of the invention. This buckle tensioner has as its main parts a linear drive 10, a belt buckle 12, a traction member 14, whose one end is attached to the linear drive 10 and whose other end is connected with the belt buckle 12, and furthermore a deflection member 16. The deflection member 16 serves to deflect the traction member 14, which is preferably in the form of a steel cable, between its two ends through an angle of approximately 90°.

The deflection member 16 is provided with a holding section 18 for the linear drive 10 and furthermore with an attachment section 20. This attachment section is provided with a hole, in which a fastening screw 22 is received. In lieu of the hole it is also possible to employ a screw bolt. By means of the screw bolt or, respectively, the fastening screw, the buckle tensioner is vehicle-fixed mounted.

In the case of the embodiment illustrated in FIG. 1 of a buckle tensioner of the invention, the attachment section 20 is arranged within the angle included between the two ends of the traction member 14. The term "angle included" is here taken to mean the smaller of the two angles which are set by the end associated with the belt buckle 12, and the end associated with the linear drive 10, of the traction member 14. The included angle amounts to approximately 90° in the case of the embodiment illustrated.

In the embodiment illustrated in FIG. 1, the longitudinal axis of the hole in the attachment section 20 extends perpendicularly to the plane, which is defined by the traction member 14. This is also the case in the second embodiment depicted in FIG. 2 of a buckle tensioner in accordance with the invention. Unlike the first embodiment in the second embodiment the attachment section 20 is however arranged outside the angle, which is included between the two ends of the traction member 14. In a manner dependent on the respective amount of space available, it is may be convenient to arrange the attachment section either within the angle included by the traction member 14 or outside same. The arrangement of the longitudinal axis of the hole in the attachment section perpendicularly to the plane defined by the traction member 14 is to be recommended more particularly in cases in which the buckle tensioner is to be mounted laterally on, for example, a vehicle seat.

Figure 3:
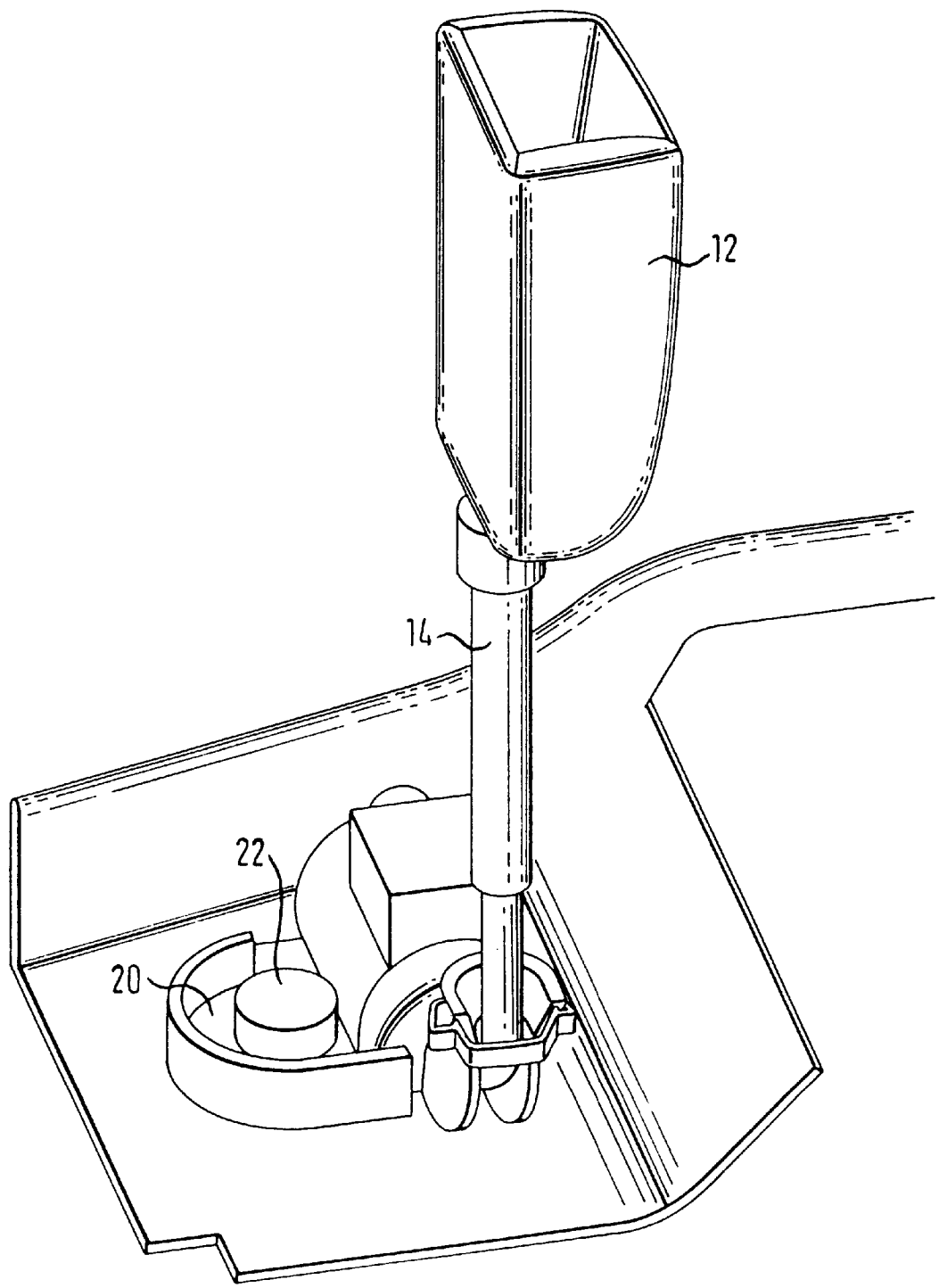
FIG. 3 is a diagrammatic perspective view of a buckle tensioner in accordance with a third embodiment of the invention.

In FIG. 3, a third embodiment of a buckle tensioner in accordance with the invention will be seen. This buckle tensioner is adapted to be screwed onto a base support, for example the floor of the vehicle. Accordingly, the longitudinal axis of the hole provided in the attachment section 20 extends in parallelism to the plane which is defined by the traction member.

Figure 4:
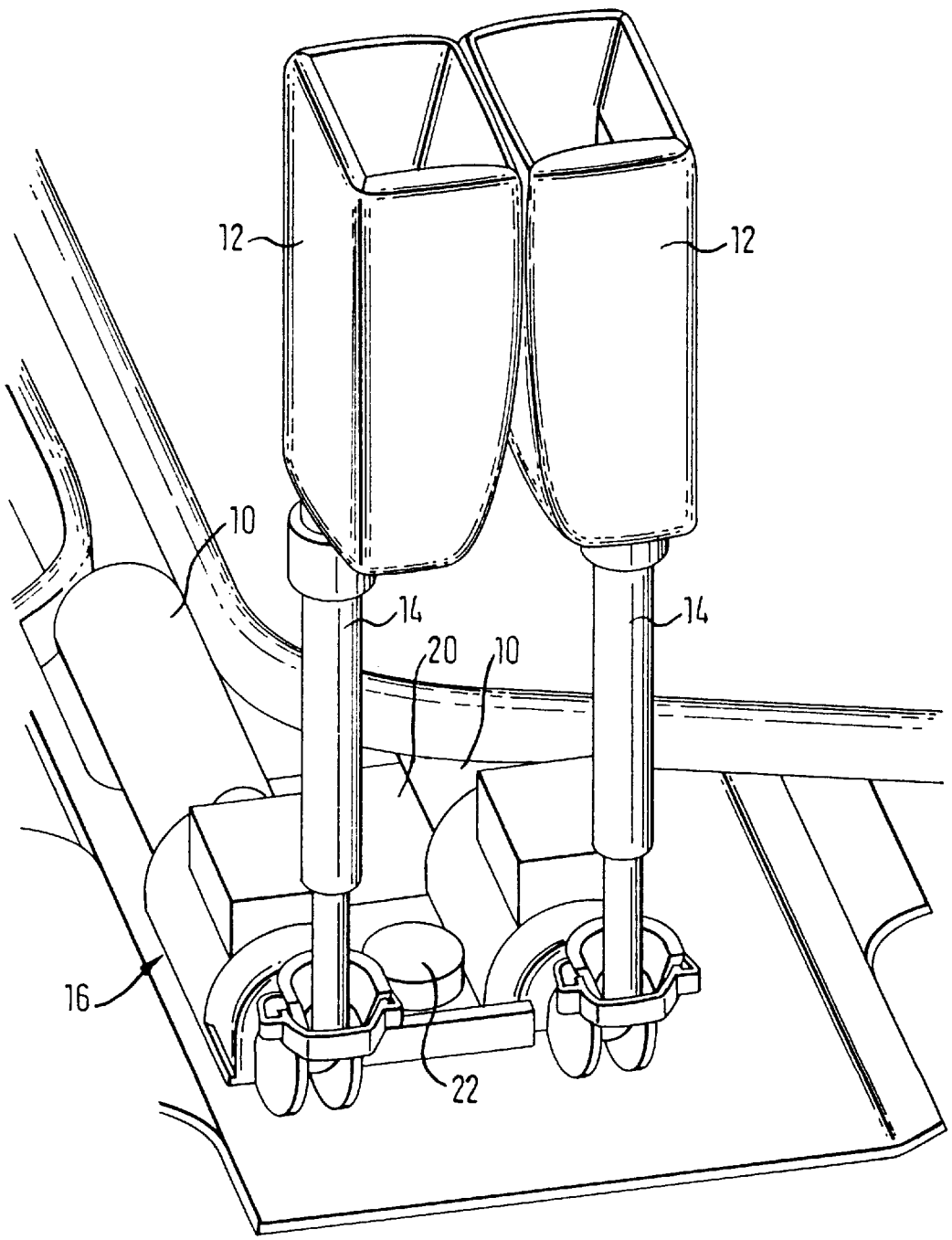
FIG. 4 is a diagrammatic perspective view of a buckle tensioner constituting a modification of the embodiment depicted in FIG. 3.

In FIG. 4, a modification of the third embodiment depicted in FIG. 3 of a buckle tensioner of the invention is represented. The modification illustrated in FIG. 4 differs from the embodiment illustrated in FIG. 3 to the extent that the two adjacently placed buckle tensioners are provided, for instance for the two buckles on the back seat of a vehicle. The attachment section 20 is in this case arranged between the two planes which are defined by the traction members 14.

Figure 5:
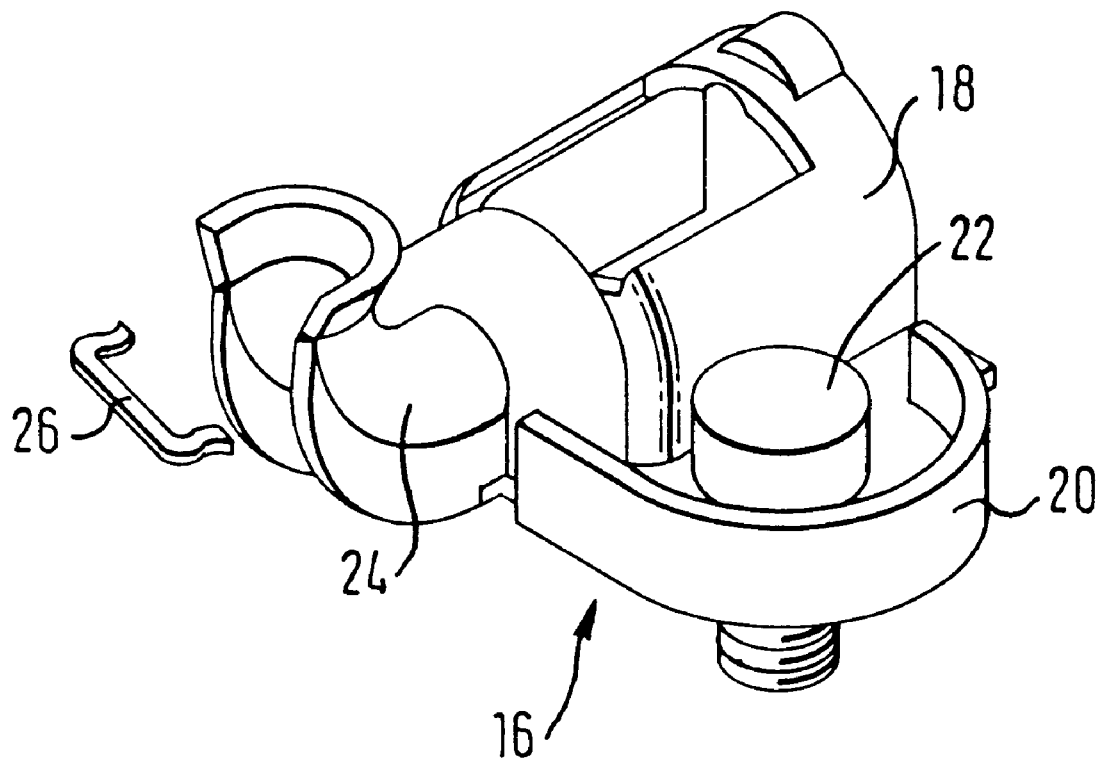
FIG. 5 is a diagrammatic perspective view of the deflection member of the buckle tensioner of FIG. 3.

In what follows the deflection members employed in the buckle tensioners of FIGS. 1 through 4 will be described in detail. In FIG. 5, a deflection member 16 is illustrated as is utilized in the third embodiment, depicted in FIG. 3, of a buckle tensioner in accordance with the invention. The deflection member 16 is a single-part piece of bent sheet metal, on which the holding section 18, the attachment section 20 and a deflection section 24 are formed. When the linear drive is mounted in the holding section 18, the latter engages the outer periphery of the cylinder tube of the linear drive 10 along an angle in the peripheral direction which is larger than 180° but is smaller than 360°. By making an appropriate selection of the dimensions of the holding section 18 in relation to the outer diameter of the cylinder tube of the linear drive 10, there will be a secure fit between of the linear drive 10 and the deflection member 16. In accordance with a possible modification of the invention, not illustrated, it is also possible for the holding section to encircle and grip the cylinder tube only for an angle larger than 90°. In this case, the cylinder tube is clamped between the holding section and the part of the vehicle with the buckle tensioner mounted on the vehicle, and accordingly is fixed in position on such part, on which the buckle tensioner is secured by means of the deflection member. The holding section 18 of the deflection member depicted in FIG. 5 is furthermore provided with an stop face, not illustrated in this figure, for the cylinder tube of the linear drive 10 so that the longitudinal forces occurring on triggering of the linear drive may be transmitted to the deflection member 16.

The deflection member section 24 is designed like a strip which is bent through approximately 90°. The outer edges of the deflection member section 24 are extended on the side remote from the center of curvature so that a groove-like guide is formed for the traction member 14 to be deflected. At its end adjacent to the belt buckle 12, the deflection member section 24 is widened out like a funnel. This accordingly ensures that the traction member is correctly drawn into the deflection member section 24 even if the belt buckle 12 is dislodged from its ideal position.

An important feature of all deflection members 16 which are employed in the various different embodiments of a belt buckle tensioner of the invention, is that the deflection member 16 is open on that side which is clear of the angle included by the two ends of the traction member 14, so that a subassembly, which comprises the linear drive 10, the belt buckle 12 and the traction member 14 connecting such parts together, may be mounted on the deflection member 16 without any difficulty. It is in fact merely necessary for the linear drive 10 to be inserted into the holding section 18 and for the traction member 14 to be placed in the deflection section 24. After this, it is merely necessary for the traction member 14 to be fixed in the deflected position. This may be performed for instance using a holding clip 26, which is clipped onto the deflection member 24 in the region to the transition between the side parts of the deflection section 24 and the funnel-like end.

Figure 6:
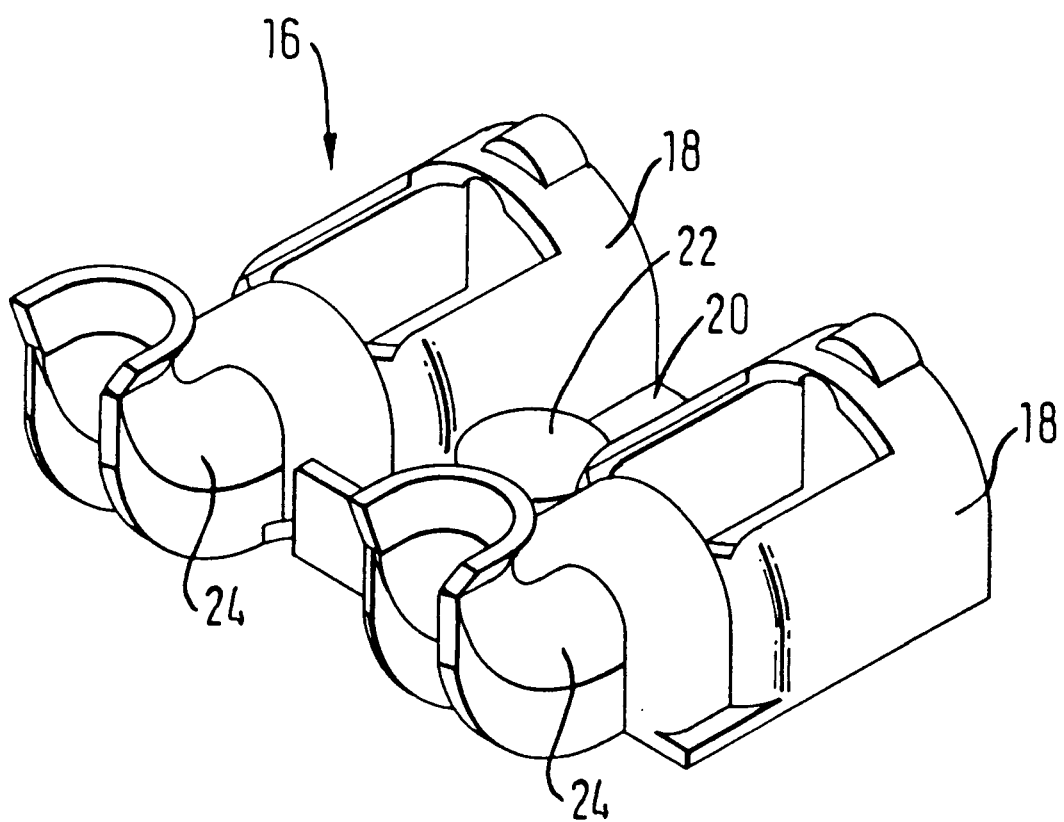
FIG. 6 is a diagrammatic perspective view of the deflection member of the buckle tensioner of FIG. 4.

In FIG. 6, the deflection member will be seen, which is employed in the buckle tensioner of FIG. 4. This deflection member 16 is substantially the same as the one illustrated in FIG. 5; there are however two holding sections 18 and two deflection member sections 24. Between the two holding sections 18, there extends an attachment section 20.

Figure 7:
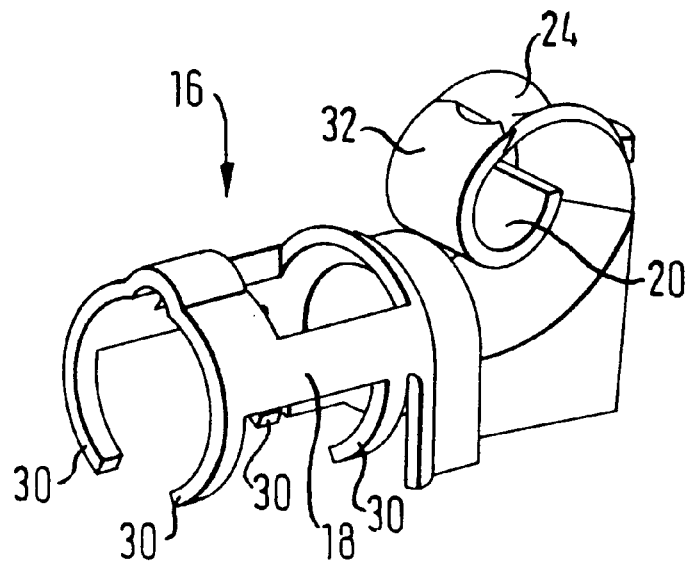
FIG. 7 is a diagrammatic perspective view of the deflection member of the buckle tensioner illustrated in FIG. 1.
Figure 8:
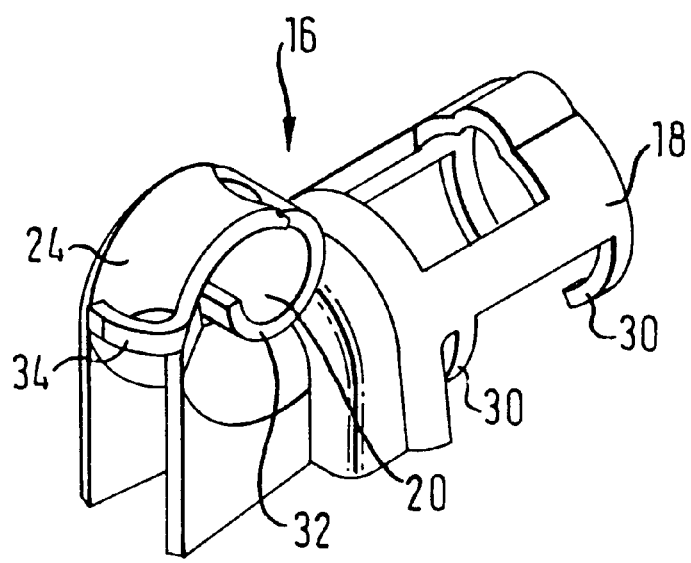
FIG. 8 is a further diagrammatic perspective view of the deflection member of FIG. 7.

In FIGS. 7 and 8, the deflection member of the buckle tensioner illustrated in FIG. 1 is shown. This deflection member 16 as well is provided with a holding section 18 for the cylinder tube of the linear drive 10, a deflection section 24 for the traction member 14 and an attachment section 20 for the attachment of the buckle tensioner on the vehicle. Unlike the deflection members depicted in FIGS. 5 and 6, the holding section 18 of the deflection member 16, illustrated in FIGS. 7 and 8, is provided with four holding lugs 30 which encircle the cylinder tube of the linear drive 10.

At its end adjacent to the belt buckle 12, the deflection section 24 is provided with an extension 32 which extends in the form of a spiral. The innermost turn of the spiral constituted by the extension 32 forms the attachment section 20.

An attachment screw, for instance, may be inserted into the interior of the spiral. However, it would also be possible to set an attachment bolt here.

The deflection member 16 illustrated in FIGS. 7 and 8 as well renders possible the fitting of the subassembly as described above, which comprises the cylinder tube, the belt buckle 12 and the traction member 14, since on the one hand the deflection section 24 is open toward the outer side and on the other hand the holding lugs 30 of the holding section 18 are opposite to each other with such a distance between them that the traction member 14 may move through between them. As more particularly illustrated in FIG. 8, on one of the longitudinal edges of the deflection section 24 a holding strip 34 is provided, which after insertion of the above mentioned subassembly into the deflection member and deflecting the traction member into the position illustrated in FIG. 8 may be bent so that the traction member 14 is fixed in the directed or deflected position.

Figure 9:
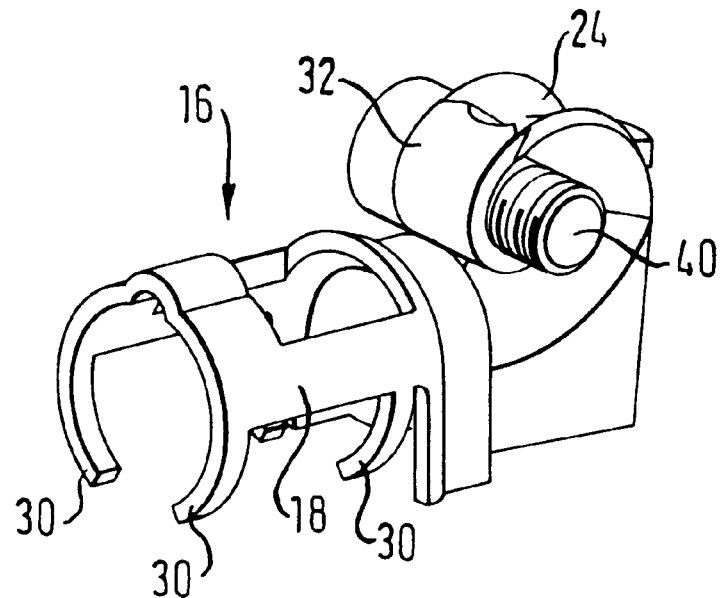
FIG. 9 shows a modification of the deflection member represented in FIGS. 7 and 8.

In FIG. 9, a modification of the deflection member 16 of FIGS. 7 and 8 will be perceived. The difference to the deflection member illustrated in FIGS. 7 and 8 is that in the case of the deflection member 16 of FIG. 9 the attachment section is provided with a screw bolt 40.

Since in the case of the deflection members depicted in FIGS. 7 through 9 the attachment section 20 is within the angle included between the two ends of the traction member 14, the attachment section 20 is urged toward the deflection section 24 under high loads, which are transferred from the belt buckle 12 via the deflection member 16 and the attachment section 20 to the vehicle. Owing to the inherent elasticity of the extension 32, the outer side of the attachment section 20 will, as from a certain level of load, directly bear against the side of the deflection section 24 lying opposite thereto.

Figure 2:
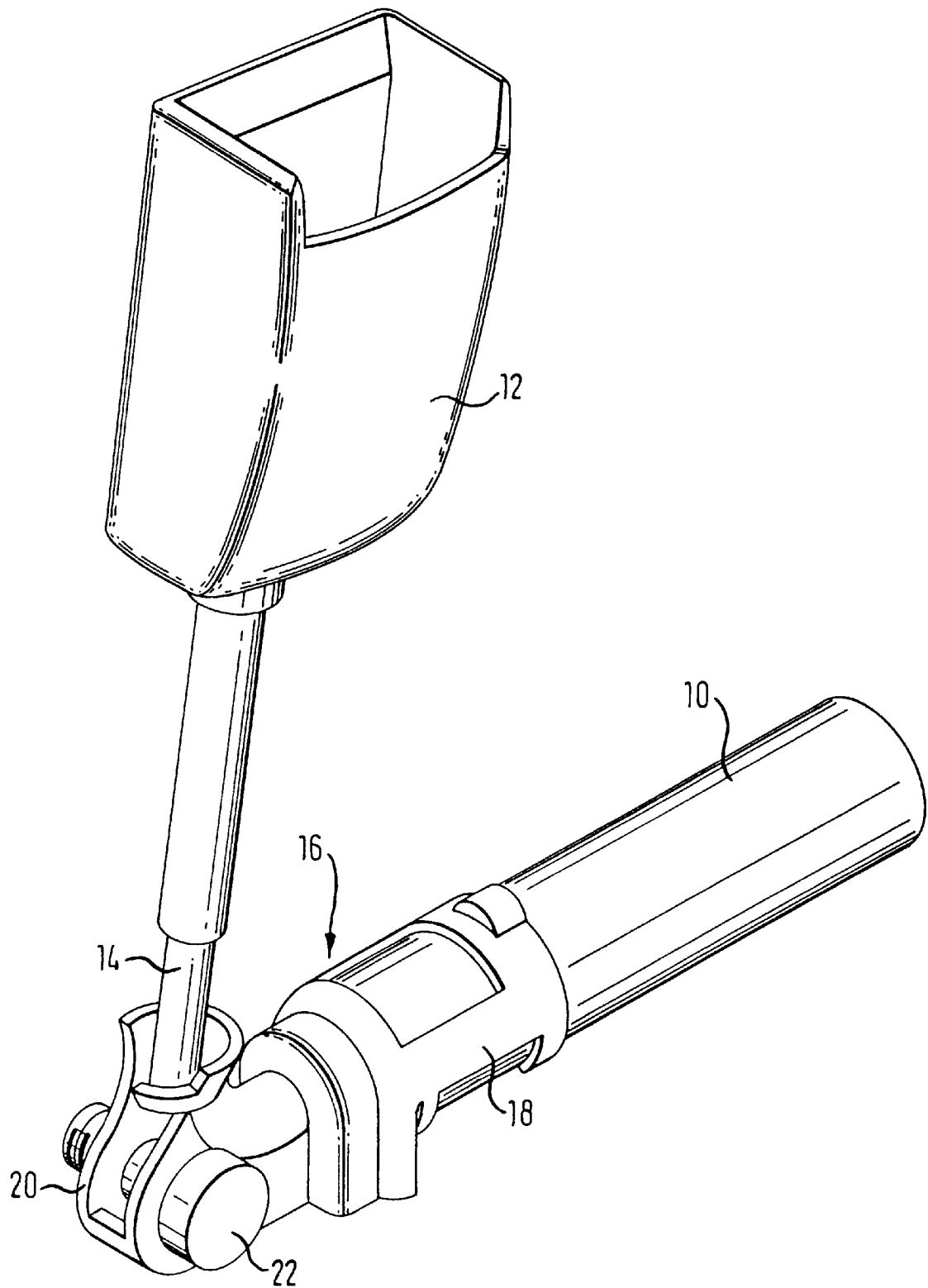
FIG. 2 is a diagrammatic perspective view of a buckle tensioner in accordance with a second embodiment of the invention.
Figure 10:
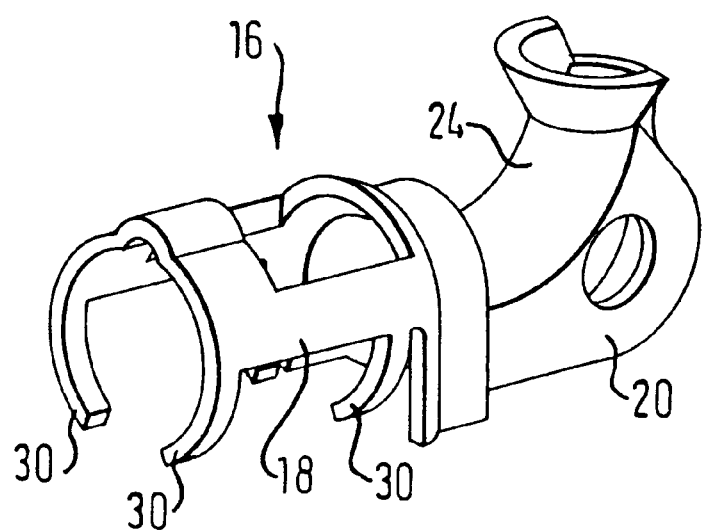
FIG. 10 shows the deflection member of the buckle represented in FIG. 2.
Figure 11:
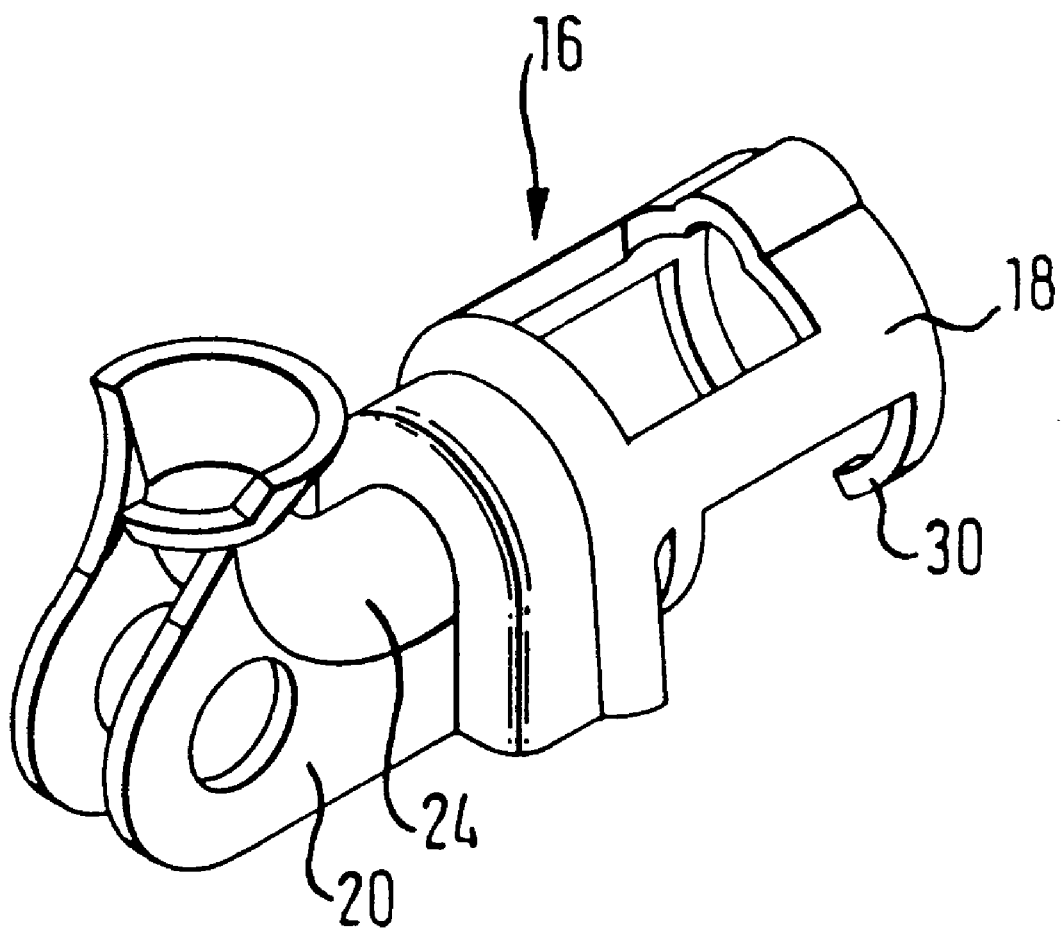
FIG. 11 is a further diagrammatic perspective view of the deflection member of FIG. 10.

In FIGS. 10 and 11, the deflection member 16 of the buckle tensioner represented in FIG. 2 will be seen. This deflection member 16 differs from the deflection member illustrated in FIGS. 7 through 9 essentially to the extent that the attachment section 20 is outside the angle which is included between the two ends of the traction member 14. In this case, the attachment section 20 is formed by two strips of material, which extend parallel to one another starting from the longitudinal edges of the deflection section 24. In these two strips of material the hole is formed, into which the fastening screw 22 may be inserted.

I claim:

1. A buckle tensioner for a vehicle, comprising a belt buckle, a linear drive connected to said belt buckle via a traction member, said traction member having a first end connected to said belt buckle and a second end connected to said linear drive, and a deflection member adapted to deflect said traction member between said first and said second ends, said deflection member comprising a holding section for said drive and an attachment section, said attachment section being adapted for fixing said deflection member in a vehicle-fixed manner, said attachment section being arranged clear of an angle included between said first and second ends, said deflection member possessing an elongated deflection section extending over an angular range of approximately 90°, said attachment section being constituted by two strips of material, said strips extending parallel to each other and being each connected with a longitudinal edge of said deflection section.

2. The buckle tensioner of claim 1, wherein said deflection section is open along said traction member and on the side outside said angle included by said first and second ends of said traction member.

3. A buckle tensioner for a vehicle, comprising a belt buckle, a linear drive connected to said belt buckle via a traction member, said traction member having a first end connected to said belt buckle and a second end connected to said linear drive, and a deflection member adapted to deflect said traction member between said first and said second ends, said deflection member comprising a holding section for said linear drive and an attachment section, said attachment section being adapted for fixing said deflection member in a vehicle-fixed manner, said attachment section being arranged within an angle included between said first and said second ends of said traction member, said deflection member possessing an elongated guide section extending over an angular range of approximately 90°, said attachment section being constituted by an extension of said deflection section at an end thereof facing said belt buckle.

4. The buckle tensioner of claim 3, wherein said extension of said deflection section is spiral in shape and wherein said attachment section is constituted by the innermost turn of said spiral-shaped extension.

5. A buckle tensioner for a vehicle, comprising a belt buckle, a linear drive connected to said belt buckle via a traction member, said traction member having a first end connected to said belt buckle and a second end connected to said linear drive, and a deflection member adapted to deflect said traction member between said first and said second ends, said deflection member comprising a holding section for said linear drive and an attachment section, said attachment section being adapted for fixing said deflection member in a vehicle-fixed manner, said linear drive possessing a cylinder tube and a piston adapted to move in translation in said cylinder tube, said holding section encircling said cylinder tube in a circumferential direction for an angle less than 360°.

6. The buckle tensioner of claim 5 wherein said holding section encompasses said cylinder tube in the circumferential direction along an angle larger than 90° and wherein said cylinder tube is clamped to said holding section when said buckle tensioner is mounted vehicle-fixed.

7. The buckle tensioner of claim 5, wherein said holding section encircles said cylinder tube in the circumferential direction over an angle of more than 180°.

8. The buckle tensioner of claim 5, wherein said holding section encompasses said cylinder tube by means of a plurality of holding lugs.

9. The buckle tensioner of claim 8, wherein said holding lugs have free ends which are arranged opposite each other in a distance which is at least equal to the diameter of said traction member.

10. A buckle tensioner for a vehicle, comprising a belt buckle, a linear drive connected to said belt buckle via a traction member, said traction member having a first end connected to said belt buckle and a second end connected to said linear drive, and a deflection member adapted to deflect said traction member between said first and said second ends, said deflection member comprising a holding section for said linear drive and an attachment section, said attachment section being adapted for fixing said deflection member in a vehicle-fixed manner, said deflection member being a bent sheet metal component.

11. The buckle tensioner of claim 10, wherein said deflection member is quenched and tempered.

12. The buckle tensioner of claim 10 wherein a holding strip is provided at one of the longitudinal edges of said deflection section, said holding strip being so bent over said deflection section that a guide adapted to the cross section of said traction member is formed together with said deflection section.

13. The buckle tensioner of claim 10, wherein said attachment section possesses a screw bolt.

14. The buckle tensioner of claim 10, wherein said attachment section has a hole for an attachment screw.

15. The buckle tensioner of claim 13, wherein said screw bolt has a center axis extending parallel to a plane defined by said traction member.

16. The buckle tensioner of claim 14, wherein said attachment screw has a center axis extending parallel to a plane defined by said traction member.

17. The buckle tensioner of claim 10, wherein said screw bolt has a center axis extending perpendicularly to a plane defined by said traction member.

18. The buckle tensioner of claim 14, wherein said attachment screw has a center axis extending perpendicularly to a plane defined by said traction member.

19. The buckle tensioner of claim 10, wherein said attachment section is arranged clear of an angle included between said first and second ends.

20. The buckle tensioner of claim 10, wherein said attachment section is arranged within an angle included between said first and said second ends of said traction member.

21. The buckle tensioner of claim 10 wherein said deflection member is a cast part.

22. The buckle tensioner of claim 10, wherein said traction member is a traction cable.

23. The buckle tensioner of claim 10, wherein said deflection member is formed integrally with said holding section and with said attachment section.

* * * * *

UNITED STATES PATENT AND TRADEMARK OFFICE
CERTIFICATE OF CORRECTION

PATENT NO. : 6,039,352
DATED : March 21, 2000
INVENTOR(S) : Franz Wier

It is certified that error appears in the above-indentified patent and that said Letters Patent is hereby corrected as shown below:

Column 6, line 62 change "10" to --13--

Signed and Sealed this

Twenty-fourth Day of April, 2001

Attest:

NICHOLAS P. GODICI

Attesting Officer

Acting Director of the United States Patent and Trademark Office